United States Patent Office 2,768,146
Patented Oct. 23, 1956

2,768,146

PLASTIC PRINTING PLATE AND MOLDING COMPOSITION FOR THE MANUFACTURE OF PLASTIC PRINTING PLATES

George W. Bainton, Jr., Pittsfield, Mass., assignor to General Electric Company, a corporation of New York No Drawing. Application December 29, 1952, Serial No. 328,531

6 Claims. (Cl. 260—17.2)

The present invention relates to plastic printing plates and to resinous molding compositions particularly suitable for the manufacture of such plates.

It is known that printing plates having certain advantages can be molded from phenolic resin molding compositions. The phenolic resin compositions previously proposed for printing plate applications have consisted essentially of a thermosetting phenolic resin binder and one or more finely divided fillers such as woodflour, asbestos, etc. The anticipated advantages of printing plates molded from such phenolic resin compositions include good wear resistance and resistance to the acids and solvents normally employed in the printing industry. Furthermore, as compared with metallic plates, the plastic plates are relatively light in weight and can be made more quickly than electrotype plates. On the other hand, the known printing plates comprising a phenolic resin binder have been somewhat brittle and lacking in shock resistance. Likewise, they have not been as resilient as is desired for many printing applications.

The present invention is based on the discovery that improved printing plates can be obtained by employing a modified phenolic resin molding composition containing as an essential modifying ingredient a limited quantity of a butadiene-acrylonitrile copolymer. The composition employed in the practice of the present invention is further characterized by a proportioning of the filler and binder contents to impart to the molded plate certain characteristics not heretofore obtainable.

More specifically, the present invention is based on the discovery that printing plates molded from a thermosetting composition composed of a particular phenolic resin and a butadiene-acrylonitrile rubber in combination with a filler consisting of asbestos floats, woodflour and high lignin content cellulose flour in specific proportions is more resilient and more shock resistant than the previously known phenolic resin printing plates.

A particularly desirable characteristic of the plates of the present invention is their ability to be post-formed which makes it possible to mold the plates flat and thereafter post-form them to a cylindrical shape for use in a rotary printing press.

Furthermore, the plates of the present invention are more flexible and more readily machinable than plates molded from resinous compositions containing only phenolic resin binder. They are also characterized by an improved abrasion and wear resistance.

In the practice of the present invention there is employed a novel molding composition consisting essentially, by weight, of from 36 to 40 percent of a two-stage phenol-formaldehyde resin, from 5 to 12 percent, preferably from 5 to 9 percent, of a butadiene-acrylonitrile copolymer containing from 30 to 45 percent, by weight, acrylonitrile, from 8 to 12 percent asbestos floats, from 18 to 28 percent woodflour and from 15 to 25 percent of a filler for example Benaloid, which is a high lignin content cellulose woodflour in which the total lignin content is present in major proportion and more fully described by the manufacturer, the Masonite Corporation, in a publication identified as Bulletin No. CD–100, issued May 1, 1951 as consisting of 49.48% of Klason Lignin (18.41% active lignin and 31.07% normal lignin), 32.16% cellulose and the balance consisting of lesser amounts of woods, fats, waxes, ash, xylan, and cellulosan. In addition to these essential ingredients, the composition usually will also contain a small amount of lubricant such as calcium stearate, a vulcanization accelerator such as benzothiazyl disulfide, sulfur, and an accelerator activator such as zinc oxide or stearic acid or both. If desired, a small amount of pigment such as red iron oxide may also be employed to give the finished plate a distinctive appearance.

The phenolic resin component of the molding composition comprises a mixture of a two-stage phenolic resin and from 8 to 14 percent, by weight, hexamethylenetetramine based on the weight of the resin. The phenol-formaldehyde resin is prepared in accordance with the process described in Patent 2,180,981—Fiedler. Briefly, this process comprises reacting 1 mol phenol and 0.7 to 1.0 mol, preferably from about 0.9 to 1 mol, formaldehyde in the presence of an acid catalyst, such as sulphuric acid, at an elevated temperature, vacuum dehydrating the product until from 79 to 87 percent of the total water present therein has been removed, immediately adding to the partially dehydrated product an aqueous dispersion of a neutralizing agent such as sodium carbonate, sodium hydroxide or lime and thereafter completely dehydrating the neutralized product under reduced pressure to obtain a fusible resin which is liquid at temperatures in the neighborhood of about 80° C., but which is solid at room temperature. Lime is a preferred neutralizing agent and is ordinarily added dispersed in water. The resultant resinous product after being cooled to a solid state is ground and mixed with from 8 to 14 percent hexamethylenetetramine to provide a thermosetting material.

The butadiene-acrylonitrile rubber component of the composition is prepared by copolymerization of a mixture of butadiene and acrylonitrile in proportions such that the acrylonitrile comprises from 30 to 45 percent of the copolymer. The product is employed in the form of a finely divided powder and the commercially available spray dried rubber of very fine particle size is preferred. The phenolic resin including the hexamethylenetetramine and the butadieneacrylonitrile copolymer are in general mixed with any vulcanizers, lubricants, or vulcanization accelerators prior to introduction of the filler.

It has been found essential that the filler component of the resinous molding composition contain all three of the finely divided materials mentioned hereinbefore in the specific proportions in order to obtain a molded product having the desired shrinkage characteristics. The asbestos floats, that is, an asbestos filler consisting of particles having a fiber length not greater than about $\frac{1}{16}$ inch, serves to decrease the shrinkage which would result if only woodflour or cellulose flour were employed. The woodflour imparts strength to the molded product and decreases its cost while the cellulose flour imparts good flow characteristics to the composition to aid in the proper formation of small dots, letters and other markings on the matrix under the low molding pressures imposed by the properties of the material comprising the matrix. With the specified combination of the asbestos floats, woodflour and cellulose flour, molded plates having a minimum shrinkage are obtained.

In the preparation of a preferred printing plate molding composition, about 36.5 parts, by weight, of the two-stage phenolic resin containing 12 percent, by weight, hexamethylenetetramine is mixed with 7.5 parts of butadiene acrylonitrile copolymer, 0.12 part calcium stearate, 0.16 part benzothiazyl disulfide, 0.3 part sulphur, 0.37 part zinc oxide and 0.07 part stearic acid on a mixing plate and then in a mixing mill adapted to grind the mixture to a fineness such that all of the material will pass through a 40-mesh screen and at least 85 percent through a 140-mesh. The resultant mixed powdered binder material is then mixed with the filler component in such proportions that the final composition contains from 42 to 50 percent binder, preferably 45 percent, and from 50 to 58 percent filler. The filler preferably comprises about 23 parts woodflour, 10 parts asbestos floats and 20 parts of the cellulose flour. Two parts red iron oxide can be added to give the finished plate a distinctive red color. The resultant mixture is hot mixed on a hot differential rolling mill and the resultant sheet material ground to 20 mesh powder. This product is then ready for use in the molding of plastic printing plates.

In the manufacture of printing plates, any suitable matrix may be employed. For example, the matrix may be the usual phenolic resin coated or bonded material now employed in the industry which previously has been molded from an electrotype master pattern. The matrix is coated with colloidal graphite and polished prior to its use in molding of the plastic printing plate. The polished matrix is then coated with a solution of paste type flour wax in toluene and heated to press temperature before loading with the plate compound. The compound is loaded on the hot matrix and immediately placed in a hot press at a press temperature of from 300 to 310° F. for about ¾ minute after which the molding pressure is increased to 500 lbs. per sq. in. and held for from 3½ to 4½ minutes. The molded plate and matrix are then removed from the press on the completion of the curing cycle and the plate immediately removed from the matrix. The increased flexibility of the products of the present invention facilitate this removal. The hot molded plate is cooled under sufficient pressure to hold it flat. After cooling the plate may be shaved, routed and beveled as required for printing, or for curving if a curved printing plate is desired. The curving process comprises heating the finished flat plate to a temperature about 300° F. in an oven or in a press or by infra-red radiation and then curving the hot plate around a form of the proper size by means of a flexible backing curtain, such as a flexible metal sheet. The plate is cooled in the curved position and when cooled is ready to be placed on the cylinder of a rotary printing press.

The curved plates made according to the procedures of the present invention are not affected at temperatures up to 100° C. and consequently can be run on fast presses equipped with high temperature ink dryers. Furthermore, the surface hardness is not affected at elevated temperatures encountered in such high speed rotary presses. There is little springback in removing a cold plate from the form and no tendency for the plate to straighten on standing at room temperature. The plate is particularly characterized by good resiliency and shock resistance.

For maximum hot strength, it is preferred to employ the hexamethylenetetramine in amounts ranging from about 10 to 14 percent, by weight, based on the weight of the two-stage resin.

What I claim as new and desire to secure by Letters Patent of the United States is:

1. A molding composition for the manufacture of plastic printing plates composed of (1) from 36 to 40 percent of a resinous material consisting of (a) a phenolic resin obtained by reacting 1 mol phenol with 0.7 to 1 mol formaldehyde in the presence of an acid catalyst, dehyrating the product until from 79 to 87 percent of the total water present has been removed, neutralizing the resultant product, substantially completely dehydrating the neutralized material under reduced pressure and (b) from 8 to 14 percent hexamethylenetetramine based on the weight of (a), (2) from 5 to 12 percent of a butadiene-acrylonitrile copolymer containing from 30 to 45 percent, by weight, acrylonitrile, (3) from 8 to 12 percent asbestos floats, (4) from 18 to 28 per cent ordinary woodflour and (5) from 15 to 25 percent of a ground high lignin content cellulose flour, said components (3), (4) and (5) comprising from 50 to 58 percent, by weight, of the total molding compositon.

2. A molding composition for the manufacture of printing plates consisting essentially, by weight, of (1) from 36 to 40 percent of a resin material consisting of (a) a phenolic resin obtained by reacting 1 mol phenol with 0.9 to 1 mol formaldehyde in the presence of sulphuric acid catalyst, dehydrating the product until from 79 to 87 percent of the total water present has been removed, neutralizing the resultant product by the addition of an aqueous suspension of lime and substantially completely dehydrating the neutralized material under reduced pressure, and (b) about 12 percent hexamethylenetetramine based on the weight of (a), (2) from 5 to 9 percent of a butadiene-acrylonitrile copolymer containing from 30 to 45 percent acrylonitrile, (3) about 10 percent asbestos floats, (4) about 23 percent woodflour, and (5) about 20 percent of a ground high lignin-content cellulose flour, said composition having the property of curing under heat to a resilient shock resistant thermoset composition.

3. A printing plate composed of the thermoset molding composition of claim 1.

4. A plastic printing plate composed of the thermoset molding composition of claim 2.

5. A molding composition for the manufacture of printing plates consisting essentially, by weight, of (1) from 36 to 40% of a resin material consisting of (a) a phenolic resin obtained by reacting 1 mol phenol with 0.9 to 1 mol formaldehyde in the presence of sulfuric acid catalyst, dehydrating the product until from 79 to 87 percent of the total water present has been removed, neutralizing the resultant product by the addition of an aqueous suspension of lime and substantially completely dehydrating the neutralized material under reduced pressure, and (b) about 12 percent hexamethylenetetramine based on the weight of (a), (2) from 5 to 9 percent of a butadiene-acrylonitrile copolymer containing 30 to 45 percent of acrylonitrile, (3) about 10 percent asbestos floats, (4) about 23 percent wood fluor, and (5) about 20 percent of a ground high lignin-content cellulose flour consisting of 18.41% active lignin, 31.07% normal lignin, 32.16% cellulose and the balance consisting of lesser amounts of woods, fats, waxes, ash, xylan, and cellulosan, said composition have the property of curing under heat to resilient shock resistant thermoset composition.

6. A plastic printing plate composed of the thermoset molding composition of claim 5.

No references cited.